US007686736B2

(12) United States Patent
Stamm et al.

(10) Patent No.: US 7,686,736 B2
(45) Date of Patent: Mar. 30, 2010

(54) SHIFT AND THROTTLE MANAGEMENT DURING CRUISE CONTROL

(75) Inventors: David A. Stamm, Howell, MI (US); Barbara A. Shuler, Brighton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 464 days.

(21) Appl. No.: 11/711,915

(22) Filed: Feb. 27, 2007

(65) Prior Publication Data

US 2007/0249464 A1 Oct. 25, 2007

Related U.S. Application Data

(60) Provisional application No. 60/794,797, filed on Apr. 25, 2006.

(51) Int. Cl.
*B60W 10/02* (2006.01)
*B60W 10/06* (2006.01)
*B60W 10/10* (2006.01)

(52) U.S. Cl. .................................................... 477/108

(58) Field of Classification Search .................. 477/52, 477/53, 54, 64, 65, 80, 84, 91, 108
See application file for complete search history.

(56) References Cited

U.S. PATENT DOCUMENTS 4,541,052 A * 9/1985 McCulloch ................ 701/110
5,778,331 A * 7/1998 Leising et al. ............... 701/66

* cited by examiner

*Primary Examiner*—Sherry L Estremsky
*Assistant Examiner*—Edwin A. Young

(57) ABSTRACT

A control system for regulating operation of a vehicle having a transmission driven by an engine during a cruise control mode includes a first module that determines an operating point of the vehicle and that compares the operating point to one of a shift line and a torque converter clutch (TCC) release line. A second module regulates a throttle of the engine to maintain the operating point a threshold distance from the one of the shift line and the TCC release line, when the operating point is at the threshold distance.

21 Claims, 3 Drawing Sheets

Start
200
Is cruise ON?
N
Y
202
Monitor vehicle operating parameters
206
Regulate throttle based on PI control
204
Is operating point at or near $d_{THR}$?
N
Y
208
Regulate throttle to track shift/TCC release line
210
Is shift or TCC release required?
N
Y
212
Ramp throttle based on PI control
214
Initiate shift or TCC release
End

SHIFT AND THROTTLE MANAGEMENT DURING CRUISE CONTROL

CROSS-REFERENCE TO RELATED APPLICATIONS

This application claims the benefit of U.S. Provisional Application No. 60/794,797, filed on Apr. 25, 2006. The disclosure of the above application is incorporated herein by reference.

FIELD OF THE INVENTION

The present invention generally relates to engine throttle control, and more particularly to engine throttle control during cruise control.

BACKGROUND OF THE INVENTION

Internal combustion engines combust a fuel and air mixture within cylinders driving pistons to produce drive torque. The engine drives a transmission through a coupling device. Air is drawn into the engine and is metered through a throttle. The transmission can include an automatic transmission whereby transmission shifts are regulated using a control module based on vehicle operating conditions. Alternatively, the transmission can include a manual transmission whereby shifts are manually executed by vehicle operator.

Cruise control systems are utilized on vehicles to enable the vehicle to maintain a desired vehicle speed. In vehicles equipped with electronic throttle control, the cruise control system provides basic proportional and integral (PI) control that is based on a vehicle speed error. The PI control, however, does not account for external modifiers on vehicle acceleration and presumes that the only vehicle acceleration input is throttle position. Therefore, calibration of cruise control for maintaining the desired vehicle speed while providing an acceptable degree of smoothness and perceived quality is difficult.

SUMMARY OF THE INVENTION

Accordingly, the present invention provides a control system for regulating operation of a vehicle having a transmission driven by an engine during a cruise control mode. The control system includes a first module that determines an operating point of the vehicle and that compares the operating point to one of a shift line and a torque converter clutch (TCC) release line. A second module regulates a throttle of the engine to maintain the operating point a threshold distance from the one of the shift line and the TCC release line, when the operating point is at the threshold distance.

In one feature, the operating point is determined based on a throttle position and a vehicle speed.

In other features, the second module regulates the throttle based on a vehicle speed error when the operating point is greater than the threshold distance. The second module regulates the throttle based on a traditional proportional-integral (PI) control.

In still other features, the first module determines whether one of a shift and a TCC release is required to maintain the vehicle speed at a desired vehicle speed and the control system further includes a third module that initiates the one of the shift and the TCC release. The control system further includes a fourth module that ramps the throttle to a desired position prior to the third module initiating the one of said shift and the TCC release. The second module determines whether one of a shift and a TCC release is required based on a vehicle operating parameter.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
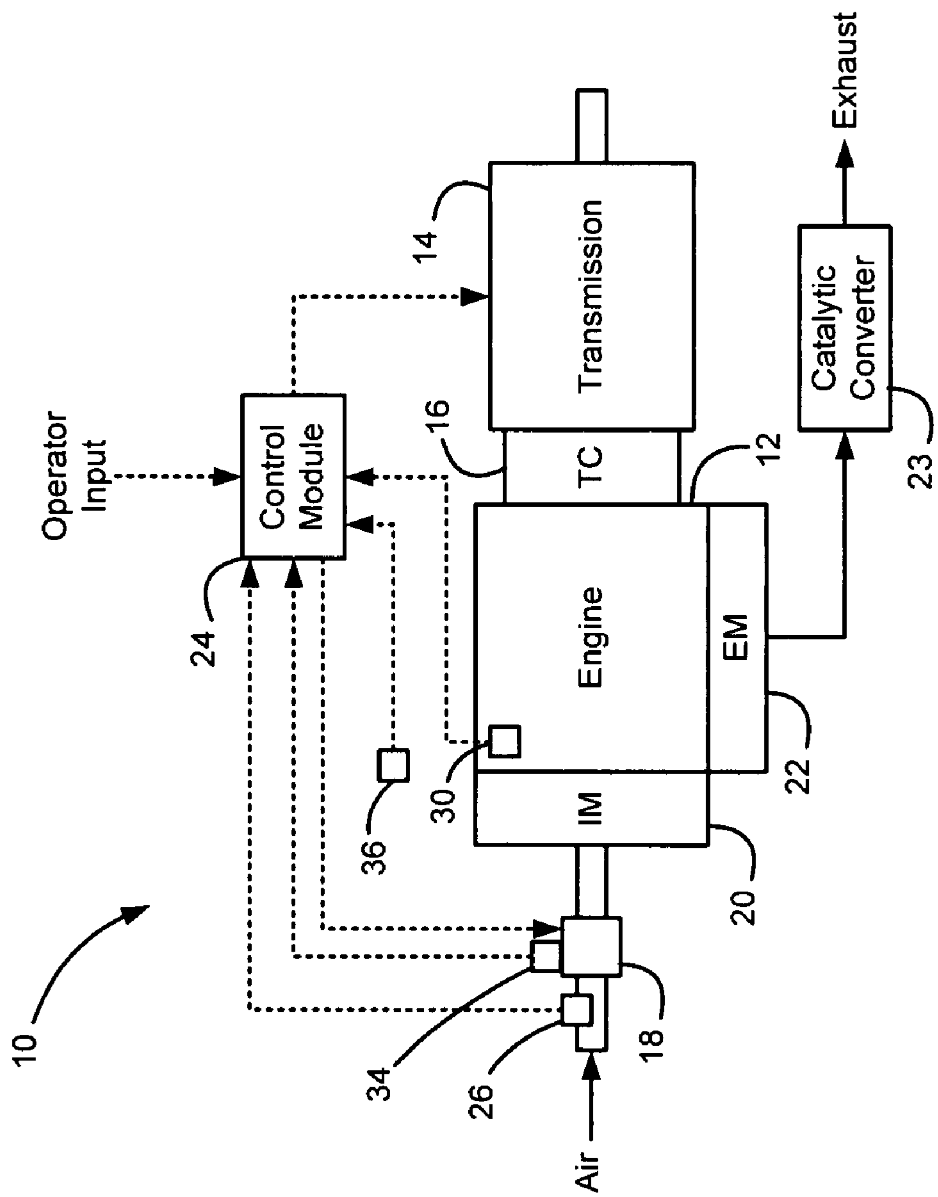
FIG. 1 is a functional block diagram of an exemplary vehicle system that is regulated in accordance with the cruise throttle control of the present invention.

The following description of the preferred embodiments is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an exemplary vehicle system 10 is illustrated. The vehicle system includes an engine 12 that drives a transmission 14 through a coupling device 16. More specifically, air is drawn through a throttle 18 into an intake manifold 20, which distributes air to cylinders (not shown). The air is mixed with fuel at a desired air-to-fuel (A/F) ratio and the A/F mixture is combusted within the cylinders to generate drive torque. The combustion products are exhausted from the engine 12 through an exhaust manifold 22 and are treated in a catalytic converter 23 before being released to atmosphere.

In the case of an automatic transmission, the coupling device 16 is a torque converter that includes a torque converter clutch (TCC) (not shown). The TCC is operable in an unlocked mode (i.e., released) to multiply torque transferred from the engine 12 to the transmission 14 and a locked mode to enable direct torque transfer from the engine 12 to the transmission 14. More specifically, in the unlocked mode, the torque converter provides a fluid coupling between the engine output shaft (not shown) and the transmission input shaft (not shown). In the locked mode, the TCC couples the engine output shaft and the transmission input shaft for common rotation. In the case of a manual transmission, the coupling device 16 is a clutch that is manually actuated by a vehicle operator to selectively uncouple the engine output shaft and the transmission input shaft from common rotation.

A control module 24 regulates operation of the engine 12 and the transmission 14 based on various vehicle operating parameters. It is anticipated that the control module 24 can include a single module or sub-modules including, but not limited to, an engine control module (ECM) and/or a transmission control module (TCM).

A mass air flow (MAF) sensor generates a MAF signal based on the MAF into the engine 12. An engine RPM sensor 30 generates an RPM signal based on the rotational velocity of a crankshaft (not shown) of the engine 12. A throttle position sensor 34 generates a throttle position signal (TPS) indicative of a driver's throttle input. The control module 24 electronically controls a position of the throttle 18 to regulate air flow into the engine. A vehicle speed sensor 36 generates a vehicle speed signal ($V_{VEH}$). It is anticipated that the vehicle speed sensor 36 can include, but is not limited to, an ABS sensor that is responsive to rotation of a wheel (not shown). It is also anticipated that a vehicle acceleration sensor (not shown) can be included to monitor vehicle acceleration ($a_{VEH}$). Alternatively, the control module 24 can calculate $a_{VEH}$ based on other sensed operating conditions.

The control module 24 also regulates operation of the engine 12 in a cruise control mode (e.g., adaptive or standard) based on an operator input. More specifically, when the operator engages cruise control (i.e., ON), the control module 24 regulates operation of the engine 12 and the transmission 14 to maintain a desired vehicle speed ($V_{DES}$) in accordance with the cruise throttle control of the present invention.

During cruise and in the case of an automatic transmission, the control module 24 regulates transmission gear shifts and TCC mode based on the vehicle operating conditions. More specifically, shifts are determined using a pre-programmed shift map or table based on throttle position and $V_{VEH}$. When the vehicle is operated at a point (i.e., throttle position and $V_{VEH}$) on the table that is over a threshold distance ($d_{THR}$) away from a shift line or TCC release line, the control module 24 operates the engine 12 and the transmission 14 using the traditional proportional-integral (PI) control. Under the PI control, the throttle position is regulated based on a vehicle speed error ($V_{ERR}$), which is the difference between $V_{VEH}$ and $V_{DES}$.

When the vehicle is operated at a point on the table that is at or near $d_{THR}$ from a shift or a TCC release line, the cruise throttle control of the present invention is enabled. More specifically, the PI control ends and the cruise throttle control regulates the throttle position to track the shift or TCC release line to maintain $d_{THR}$ from the line. During this time, the cruise throttle control analyzes several parameters to determine whether the shift (e.g., downshift) or TCC release is needed. In this manner, the cruise throttle control provides increased smoothness of operation in maintaining $V_{VEH}$ at $V_{DES}$ to enhance the perceived quality of the cruise control system and the vehicle itself.

The cruise throttle control evaluates vehicle operating parameters to determine whether a shift (e.g., downshift) is required. The vehicle operating parameters include, but are not limited to, $V_{ERR}$, $a_{VEH}$, MAP, engine torque reserve and performance enrichment onset. Engine torque reserve is defined as the amount of available engine torque above what is being provided to the wheels, for the given gear ratio.

If the vehicle operating parameters indicate that the vehicle can achieve $V_{DES}$, the shift or TCC release is inhibited and the throttle is regulated to maintain $d_{THR}$ from the shift or TCC release line. However, if the vehicle operating parameters indicate that the shift or TCC release is required to achieve $V_{DES}$, the throttle is ramped up to the desired position, switching back to the PI control. Once the shift or TCC release occurs, the cruise throttle control is re-enabled for the next shift or TCC release line. In this manner, as the vehicle is operated on a level road and then encounters a hill, the cruise throttle control manages the potential increase in wheel torque that would otherwise occur if a TCC release or shift were to be executed. It should be noted that, in the case of an automatic transmission, the shift can occur at a much lower throttle position, whereby the shift occurs early in the hill or maneuver to provide the increased smoothness and perceived quality of the cruise control system.

In the case of a manual transmission, the cruise throttle control does not induce or inhibit shifting of the transmission 14. Instead, the cruise throttle control initiates a shift indicator that is visual, audible or both, and which advises the driver that a shift should be performed.

Figure 2:
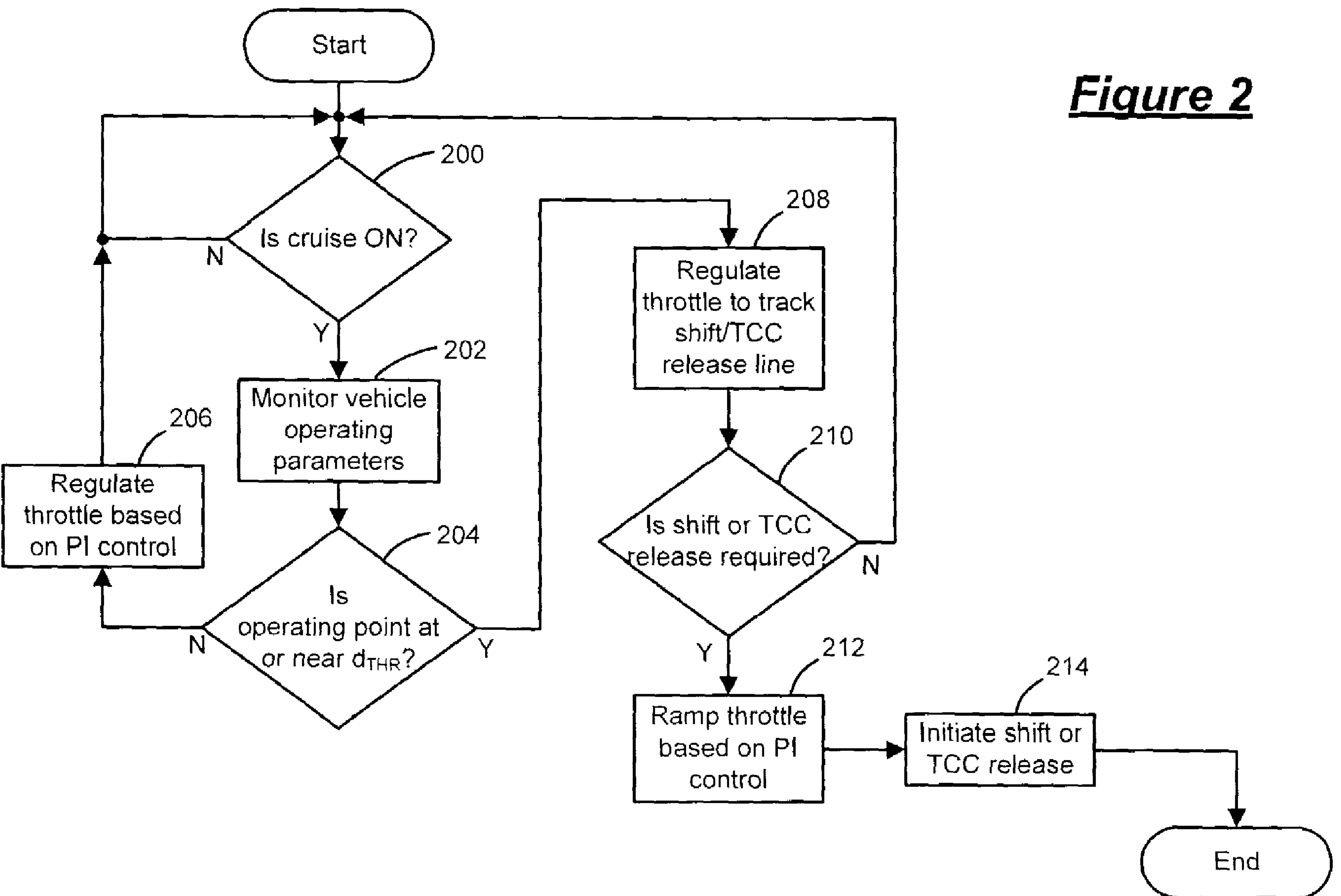
FIG. 2 is a flowchart illustrating exemplary steps executed by the cruise throttle control of the present invention.

Referring now to FIG. 2, exemplary steps executed by the cruise throttle control will be discussed in detail. In step 200, control determines whether cruise is ON. If cruise is not ON, control loops back. If cruise is ON, control monitors the vehicle operating parameters in step 202. In step 204, control determines whether the current operating point is at or near $d_{THR}$ from the shift or TCC release line. If the current operating point is not at or near $d_{THR}$, control regulates the throttle position based on the PI control in step 206 and loops back to step 200. If the current operating point is at or near $d_{THR}$, control regulates the throttle such that the operating point tracks the shift or TCC release line to maintain $d_{THR}$ in step 208.

In step 210, control determines whether a shift or TCC release is required based on the vehicle operating parameters. If a shift or TCC release is not required, control loops back to step 200. If a shift or TCC release is required, control continues in step 212. In step 212, control ramps the throttle to a desired position, based on the PI control. Control initiates the shift or TCC release in step 214 and ends. In the case of a manual transmission, steps 214 and 216 are not executed. Instead, control initiates and indicator to advise the driver that a manual shift should be executed.

Figure 3:
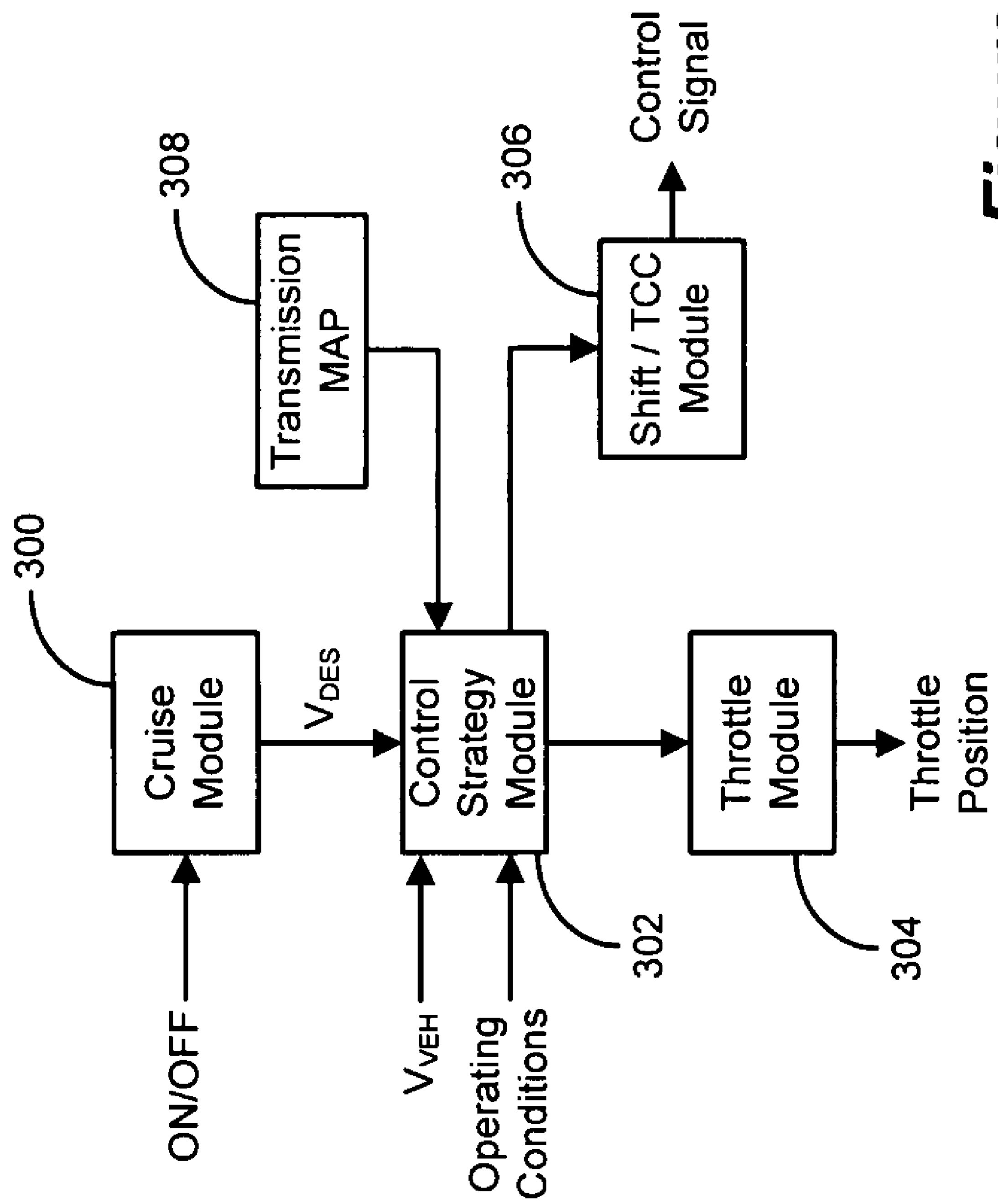
FIG. 3 is a functional block diagram of exemplary modules that execute the cruise throttle control of the present invention.

Referring now to FIG. 3, exemplary modules that execute the cruise throttle control of the present invention will be discussed in detail. The exemplary modules include a cruise module 300, a control strategy module 302, a throttle module 304, a shift/TCC module 306 and a transmission map module 308. The cruise module 302 switches vehicle operation between ON/OFF and provides $V_{DES}$ to the control strategy module 302.

The control strategy module 302 generates control signals to the throttle module 304 and the shift/TCC module 306 based on $V_{DES}$, $V_{VEH}$, and shift or TCC release point data provided by the transmission map module 308 and other vehicle operating parameters described in detail above. More specifically, the control strategy module 302 generates control signals to regulate the throttle position based on the traditional PI control when the vehicle is operating a threshold distance from a shift or TCC release line. If the vehicle is operating within a range of the shift or TCC release line, the control strategy module 302 generates control signals such that the vehicle operating parameters track the shift or TCC release line and inhibit a shift or TCC release. If a shift or TCC release is required, the control strategy module 302 generates control signals to ramp the throttle based on the traditional PI control and to initiate the shift and/or TCC release.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to a skilled practitioner upon a study of the drawings, specification and the following claims.

What is claimed is:

1. A control system for regulating operation of a vehicle having a transmission driven by an engine during a cruise control mode, comprising:

a first module that determines an operating point of said vehicle and that compares said operating point to one of a shift line and a torque converter clutch (TCC) release line; and a second module that regulates a throttle of said engine to maintain said operating point a threshold distance from said one of said shift line and said TCC release line, when said operating point is at said threshold distance.

2. The control system of claim 1 wherein said operating point is determined based on a throttle position and a vehicle speed.

3. The control system of claim 1 wherein said second module regulates said throttle based on a vehicle speed error when said operating point is greater than said threshold distance, and wherein said second module regulates said throttle based on proportional-integral (PI) control logic when said operating point is greater than said threshold distance.

4. The control system of claim 1 wherein said first module determines whether one of a shift and a TCC release is required to maintain said vehicle speed at a desired vehicle speed and further comprising a third module that initiates said one of said shift and said TCC release.

5. The control system of claim 4 further comprising a fourth module that ramps said throttle to a desired position prior to said third module initiating said one of said shift and said TCC release.

6. The control system of claim 4 wherein said second module determines whether one of a shift and a TCC release is required based on a vehicle operating parameter.

7. The control system of claim 1 wherein said threshold distance corresponds to a threshold speed that is between a desired vehicle speed and said one of said shift line speed and said TCC release line speed.

8. The control system of claim 1 wherein said threshold distance corresponds to a vehicle speed and an engine throttle position, wherein said first module compares said operating point to a threshold speed that is said threshold distance from said one of said shift line speed and said TCC release line speed, and wherein said second module regulates said throttle based on said comparison between said operating point and said threshold speed.

9. A method of regulating a vehicle having a transmission driven by an engine during operation in a cruise control mode, comprising:

determining an operating point of said vehicle comparing said operating point to one of a shift line and a torque converter clutch (TCC) release line; and regulating a throttle of said engine to maintain said operating point a threshold distance from said one of said shift line and said TCC release line, when said operating point is at said threshold distance.

10. The method of claim 9 wherein said operating point is determined based on a throttle position and a vehicle speed.

11. The method of claim 9 further comprising regulating said throttle based on a vehicle speed error when said operating point is greater than said threshold distance:

wherein said regulating is based on proportional-integral (PI) control logic when said operating point is greater than said threshold distance.

12. The method of claim 9 further comprising:

determining whether one of a shift and a TCC release is required to maintain said vehicle speed at a desired vehicle speed; and initiating said one of said shift and said TCC release.

13. The method of claim 12 further comprising ramping said throttle to a desired position prior to initiating said one of said shift and said TCC release.

14. The method of claim 12 wherein said determining whether one of a shift and a TCC release is required is based on a vehicle operating parameter.

15. A method of regulating operation of a vehicle having a transmission driven by an engine, comprising:

determining whether a cruise control mode is on;

monitoring a vehicle speed;

determining an operating point of said vehicle based on said vehicle speed;

comparing said operating point to one of a shift line and a torque converter clutch (TCC) release line; and regulating a throttle of said engine to maintain said operating point a threshold distance from said one of said shift line and said TCC release line, when said operating point is at said threshold distance when said cruise control mode is on.

16. The method of claim 15 wherein said operating point is further determined based on a throttle position.

17. The method of claim 15 further comprising regulating said throttle based on a vehicle speed error when said operating point is greater than said threshold distance.

18. The method of claim 17 wherein said throttle is regulated based on a traditional proportional-integral (PI) control.

19. The method of claim 15 further comprising:

determining whether one of a shift and a TCC release is required to maintain said vehicle speed at a desired vehicle speed; and initiating said one of said shift and said TCC release.

20. The method of claim 19 further comprising ramping said throttle to a desired position prior to initiating said one of said shift and said TCC release.

21. The method of claim 19 wherein said determining whether one of a shift and a TCC release is required is based on a vehicle operating parameter.

* * * * *